(12) United States Patent
Futehally

(10) Patent No.: US 8,610,008 B2
(45) Date of Patent: Dec. 17, 2013

(54) CONVEYOR BELT SCALE WITH CONVEYOR BELT SURROUNDED BY A PRESSURE RESISTANT EXPLOSION PROTECTED HOUSING

(75) Inventor: Habib Futehally, Mumbai (IN)

(73) Assignee: FLSMIDTH A/S (DK)

( * ) Notice: Subject to any disclaimer, the term of this patent is extended or adjusted under 35 U.S.C. 154(b) by 504 days.

(21) Appl. No.: 12/736,779

(22) PCT Filed: Dec. 23, 2009

(86) PCT No.: PCT/IB2009/008075
§ 371 (c)(1),
(2), (4) Date: Nov. 9, 2010

(87) PCT Pub. No.: WO2010/084378
PCT Pub. Date: Jul. 29, 2010

(65) Prior Publication Data
US 2011/0147098 A1    Jun. 23, 2011

(30) Foreign Application Priority Data

Jan. 23, 2009   (DE) ............... 20 2009 000 821 U
Apr. 22, 2009   (DE) ............... 20 2009 005 883 U

(51) Int. Cl.
*G01G 21/28*    (2006.01)
*G01G 11/00*    (2006.01)
*G01G 11/04*    (2006.01)

(52) U.S. Cl.
USPC .......................................... 177/145; 177/238

(58) Field of Classification Search
USPC ............................. 177/119, 145, 239–244
See application file for complete search history.

(56) References Cited

U.S. PATENT DOCUMENTS

| | | | |
|---|---|---|---|
| 2,765,816 A | | 10/1956 | Carter |
| 3,324,960 A | | 6/1967 | Bauer et al. |
| 3,498,396 A | | 3/1970 | Johnston |
| 3,542,091 A | | 11/1970 | Carter |
| 4,320,809 A | * | 3/1982 | Knothe et al. ............. 177/243 |
| 4,353,427 A | | 10/1982 | Stock et al. |
| 4,619,147 A | * | 10/1986 | Yoshimura et al. ...... 73/862.381 |
| 5,686,653 A | * | 11/1997 | Homer et al. ............... 73/1.13 |
| 5,747,747 A | * | 5/1998 | Cadou et al. ............... 177/145 |

(Continued)

FOREIGN PATENT DOCUMENTS

| | | |
|---|---|---|
| DE | 1 264 088 | 3/1968 |
| DE | 1 919 368 | 10/1969 |
| DE | 2 037 465 | 2/1972 |

OTHER PUBLICATIONS

International Search Report.

*Primary Examiner* — Randy W Gibson
(74) *Attorney, Agent, or Firm* — Aaron M. Pile; Daniel DeJoseph; Jeffrey A. Sharp

(57) ABSTRACT

A conveyor belt scale (1) for transporting and weighing bulk material, having a rocker (6) that acts on a rod system (9), and having a weighing cell (11) connected with the rod system (9), is supposed to be configured in such a manner that the weighing cell, in particular, can also be reached from the outside.

Figure 1:
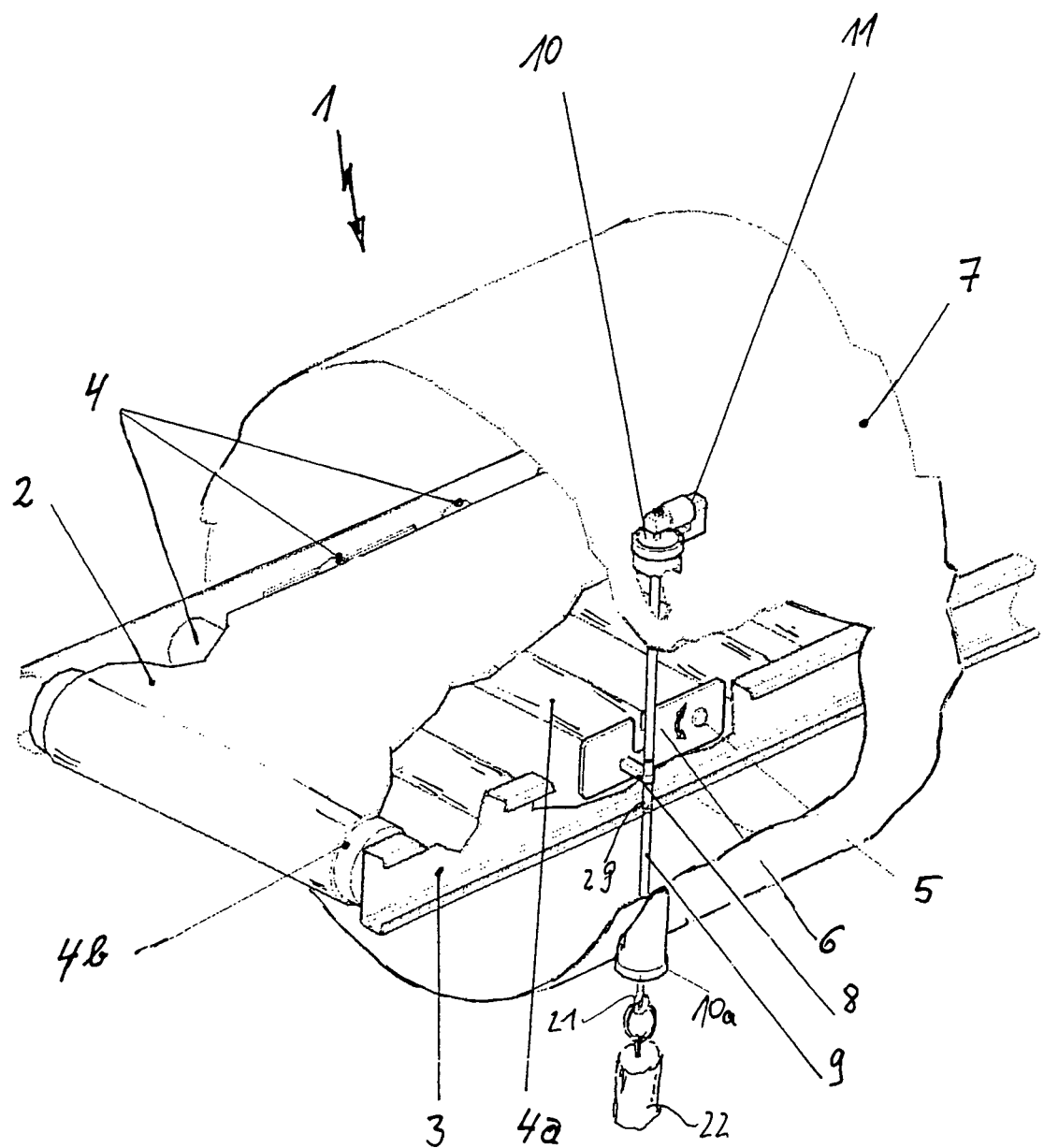

This is achieved in that the conveyor belt (2) is surrounded by a pressure-resistant, explosion-protected housing (7), whereby the rod system (9) that acts on the weighing cell (11) is passed out of the housing (7) by way of at least one elastic bearing (10) having a pressure-resistant seal, whereby the weighing cell (11) is positioned outside of the housing (7).

6 Claims, 3 Drawing Sheets

(56) References Cited

U.S. PATENT DOCUMENTS

| | | |
|---|---|---|
| 5,877,456 A | 3/1999 | Homer, III et al. |
| 6,273,665 B1 * | 8/2001 | Homer, III ............... 414/327 |
| 6,329,611 B1 * | 12/2001 | Abe et al. ............... 177/124 |
| 6,509,533 B1 * | 1/2003 | Tanaka et al. ............... 177/126 |
| 6,945,130 B2 * | 9/2005 | Burkhard ............... 73/865.6 |
| 6,958,452 B2 * | 10/2005 | Takahashi ............... 177/145 |
| 2009/0090603 A1 | 4/2009 | Ricciardi, Sr. et al. |

* cited by examiner

CONVEYOR BELT SCALE WITH CONVEYOR BELT SURROUNDED BY A PRESSURE RESISTANT EXPLOSION PROTECTED HOUSING

CROSS REFERENCE TO RELATED APPLICATIONS

This application is the National Stage of PCT/IB2009/008075 filed on Dec. 23, 2009, which claims priority under 35 U.S.C. §119 of German Application No. 20 2009 000 821.5 filed on Jan. 23, 2009 and German Application No. 20 2009 005 883.2 filed on Apr. 22, 2009, the disclosures of which are incorporated by reference. The international application under PCT article 21(2) was not published in English.

The invention is directed at a conveyor belt scale for transporting and weighing bulk material, having a rocker that acts on a rod system, and having a weighing cell connected with the rod system.

Such conveyor belt scales are known in various embodiments. For example from DE 12 64 088 A or DE 20 37 465 A, whereby other weighing cell solutions can be derived, for example, from DE 19 19 368, U.S. Pat. No. 2,765,816, U.S. Pat. No. 3,498,396, or US 2009/0090603 A1.

In power plants, for example, that use fossil fuels, such as soft coal or hard coal, this fuel must be fed to the burners, in each instance, as precisely metered as possible, and conveyor belt scales of the type stated are used for this purpose, among others. If dusts are burned, a problem can be seen in that these dusts have a tendency toward uncontrolled explosions, so that many of the elements, also in the conveyance path, are encapsulated in pressure-proof manner. If one inserts weighing cells into the pressure-resistant encapsulated housings, these are difficult to reach in the event of damage.

This is where the invention takes its start, the task of which consists in configuring such a conveyor belt scale in such a manner that the weighing cells, in particular, can also be reached from the outside.

This task is accomplished, according to the invention, with a conveyor belt scale of the type indicated initially, in that the conveyor belt is surrounded by a pressure-resistant, explosion-protected housing, whereby the rod system that acts on the weighing cell is passed out of the housing by way of at least one elastic bearing having a pressure-resistant seal, whereby the weighing cell is positioned outside of the housing.

By means of transferring the movements of the transmission rod system that acts on the weighing cell, in each instance, to an area outside of the pressure-resistant housing, it is guaranteed that the weighing cell can be reached from the outside at all times, without having to open the pressure-resistant housing.

Another very significant advantage of the invention consists in that the weighing cell, which is generally very temperature-sensitive, is no longer positioned in the region of very high temperatures, so that measurement errors are avoided, to the greatest possible extent.

In an embodiment, it is provided that the housing is configured to be cylindrical, at least in the region of the weighing cell, whereby the rod system that acts on the weighing cell passes through the housing tangentially and is guided in two elastic sealing bearings.

Without having the invention be restricted specifically to tangential passage of the rod system that acts on the weighing cell, a particular feature of the present invention particularly lies in that this rod system not only acts on the weighing cell, which generally lies at the top, but also is guided out of a corresponding housing in a downward direction, so that it can be used for pressure compensation there, and this in turn greatly increases the measurement accuracy as compared with known solutions.

In a modified embodiment, it can be provided that the housing is provided, in the region of the weighing cell, with an attachment that projects outward and has at least two side walls that lie opposite one another, in which a diaphragm through which the rod system that acts on the weighing cell passes is positioned, as a pressure-resistant seal.

According to the invention, it can also be provided that the rocker has an attachment through which the transfer rod passes, whereby the transfer rod is provided with an outside thread in the region of the attachment, and the attachment is provided with a corresponding inside thread, for adjusting the transfer rod.

In a further embodiment, it is provided, according to the invention, that the frame that carries the conveyor belt is equipped with wheels that can run on rails, for bringing the conveyor belt with the related scale elements into the pressure-resistant, explosion-protected housing and/or removing it from it.

It can also be advantageous if the drive roller of the conveyor belt is equipped with a coupling element, and the drive motor is equipped with a corresponding coupling element, for tool-free coupling and uncoupling of the drive roller, as the invention also provides, whereby furthermore, it can be provided that the transfer rod for transferring the rocker movements is equipped with a separation coupling, whereby the housing is provided with a viewing window for monitoring the coupling process.

In the following, the invention will be explained in greater detail, using the drawing as an example. This shows, in FIG. 1 a simplified spatial representation of a conveyor belt scale according to the invention, with a pressure-resistant surrounding housing, FIG. 2 a modified exemplary embodiment of a housing attachment with weighing cell, as well as in FIG. 3 a simplified spatial representation of the conveyor belt scale, partly pulled out of the housing.

The conveyor belt scale, indicated in general with 1, is formed by a conveyor belt indicated with 2, which is carried by a plurality of rollers 4 mounted in a frame 3, whereby a roller indicated with 4a acts on a rocker 6 that can pivot about a pivot axis 5; the roller on the face side that deflects the conveyor belt 2 is indicated with 4b in FIG. 1. The conveyor belt 2 is surrounded by a pressure-resistant and explosion-protected housing, indicated in general with 7, which is partly shown broken open.

An attachment indicated with 8 is firmly connected with the rocker 6, which attachment carries a transfer rod 9 that is positioned essentially perpendicular to the roller 4a, which rod is disposed there so as to be adjustable in height, by way of a thread not shown in any detail in FIG. 1.

The transfer rod 9 passes through the pressure-resistant housing 7 which is cylindrical in FIG. 1 approximately tangentially and is passed to the outside by means of an upper and lower bearing, indicated in general with 10, whereby a weighing cell 11 that is only suggested in the figures is positioned outside the housing 7, in the region of the upper bearing 10. At the lower end 9a, the transfer rod 9 has a hook, so that elements for pressure compensation, which are not shown in any detail, can be attached. For a better differentiation, the bearing assigned to the weighing cell 11 is indicated with 10, while the opposite bearing is indicated with 10a.

Figure 2:
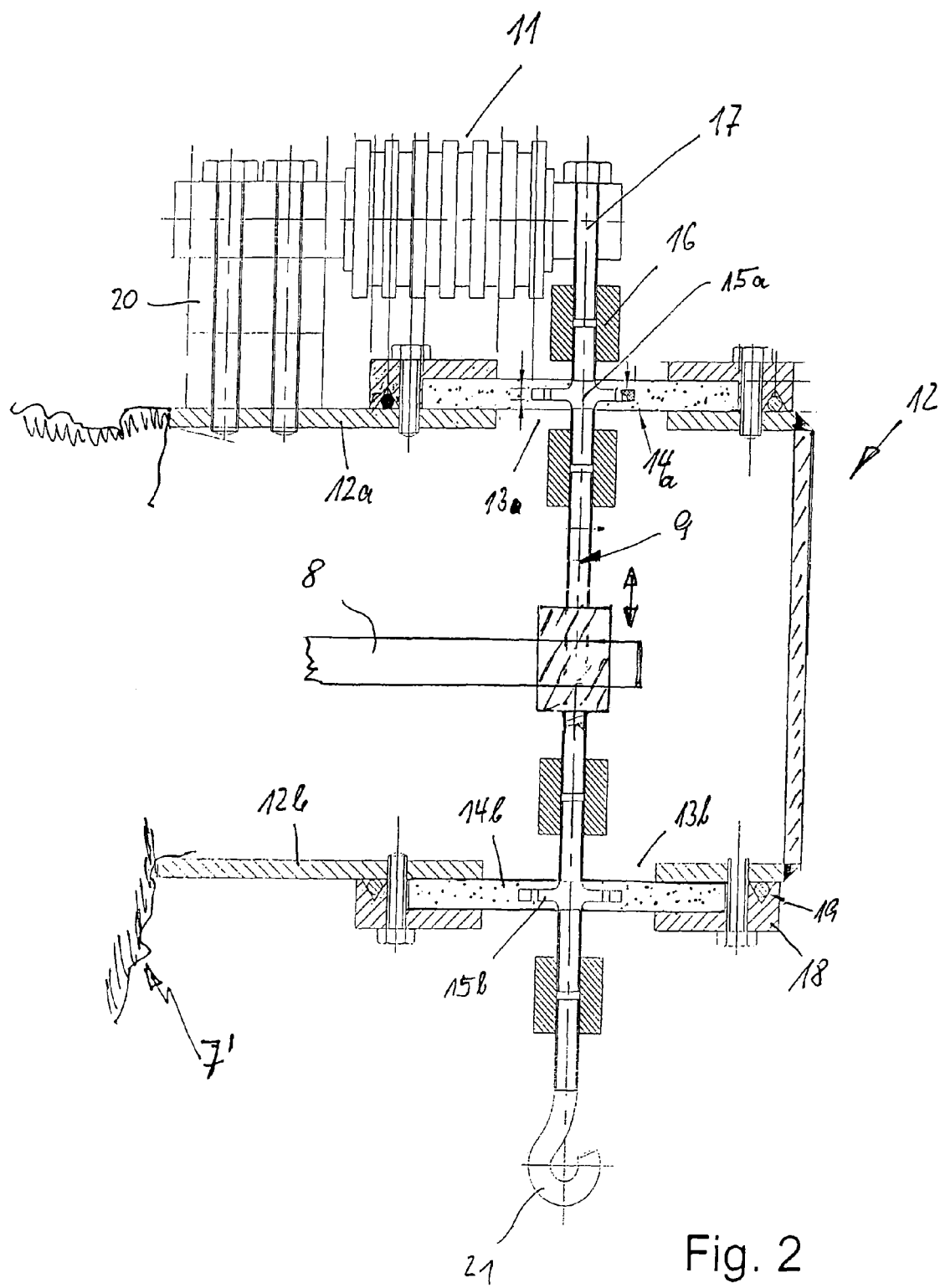
Figure 3:
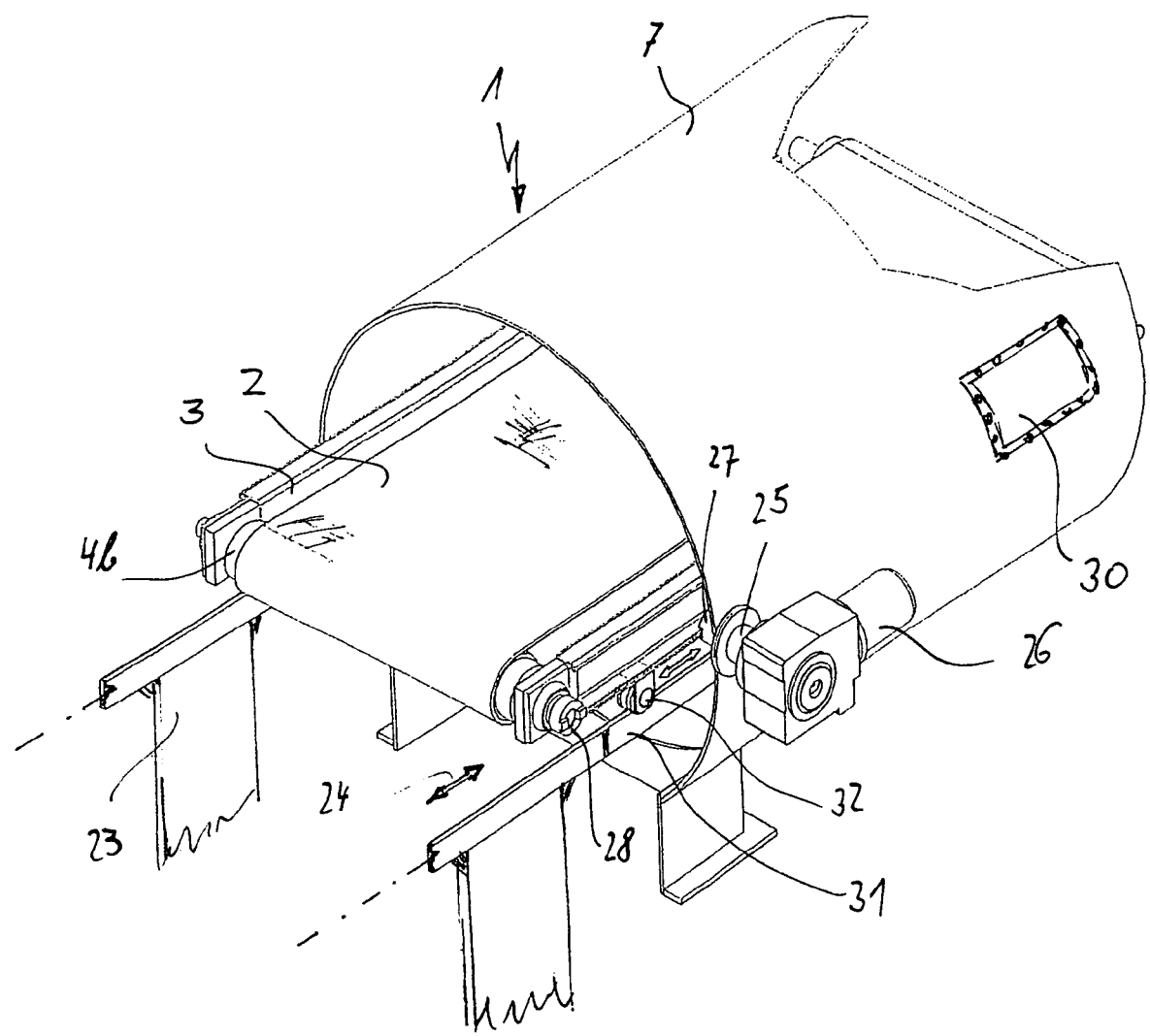

In FIG. 2, a slightly modified exemplary embodiment of the invention is shown in section, whereby here, the pressure-resistant housing 7', which is not reproduced in any detail here, is equipped with a box-like attachment, indicated in general with 12, which attachment has two parallel wall surfaces 12a and 12b that lie opposite one another, which are equipped with two openings 13a and 13b.

These two openings 13a and 13b in the parallel wall regions 12a and 12b are closed off by a diaphragm or a comparable elastic and simultaneously sealing element 14, in each instance, into which a rod system element 15a and 15b is cast, in each instance, which element is equipped with threaded pegs that face outward and inward. Rod system elements are screwed to this by means of cap nuts 16 or similar connection elements, for example the connection screw 17 for the weighing cell 11 and also the rod 9 that transfers the movement of the attachment 8 on the rocker not shown in FIG. 2. The diaphragms 14a and 14b are screwed to the wall elements 12a and 12b by means of clamping rings 18 and ring seals 19; the weighing cell 11 is also attached to one of the wall elements, indicated in FIG. 2 with 12a, by way of a bearing block 20.

In FIGS. 1 and 2, it is also shown that the transfer rod 9 that is passed out of the housing is provided with a hook 21 at its lower end, on which hook a compensation weight 22 can be suspended, in order to tare the weighing device as a whole.

The entire belt scale, insofar as the conveyor belt 2 and the devices connected with it are concerned, can be pulled out of the pressure-resistant housing 7 after a lock door (not shown) has been opened, specifically onto a rack 23 that is only suggested. This pulling out and bringing back into position is indicated with a double arrow 24.

In order to allow simple pulling out, for example for repair work, the power take-off 25 of the motor 26 that drives the belt 2 has a coupling element 27 in the interior of the pressure housing 7, which element interacts with a corresponding coupling element 28 on the drive roller 4b.

In the region of the lever arm that transfers the oscillations to the measurement device, a double coupling element 29 is also provided on the transfer rod 9, whereby the coupling and uncoupling can be observed, by way of a pressure-resistant window 30 in the housing 7, for example.

Of course, the exemplary embodiment of the invention as described can still be modified in many different aspects, without departing from the basic idea of the invention. For example, the invention is particularly not restricted to the configuration of the rod system, and also not to the positioning of the weighing cell relative to the housing; the diaphragm 14 can be configured as a sealing bar that transfers linear movement, etc., etc.

The invention claimed is:

1. A conveyor belt scale for transporting and weighing bulk material, having a rocker that acts on a rod system comprising a transfer rod for transferring rocker movements, and having a weighing cell connected with the rod system, wherein the conveyor belt is surrounded by a pressure-resistant, explosion-protected housing, wherein the rod system that acts on the weighing cell is passed out of the housing by way of at least one elastic bearing having a pressure-resistant seal, wherein the weighing cell is positioned outside of the housing, wherein the transfer rod for transferring the rocker movements is equipped with a separation coupling, and wherein the housing is provided with a viewing window for monitoring the coupling process.

2. The conveyor belt scale according to claim 1, wherein the housing is configured to be cylindrical, at least in the region of the weighing cell, wherein the rod that acts on the weighing cell passes through the housing tangentially and is guided in two elastic sealing bearings.

3. The conveyor belt scale according to claim 1, wherein the housing is provided, in the region of the weighing cell, with an attachment that projects outward and has at least two parallel side walls that lie opposite one another, in which a diaphragm through which the rod system that acts on the weighing cell passes is positioned, as a pressure-resistant seal.

4. The conveyor belt scale according to claim 1, wherein the rocker has an attachment through which the transfer rod passes, wherein the transfer rod is provided with an outside thread in the region of the attachment, and the attachment is provided with a corresponding inside thread, for adjusting the transfer rod.

5. The conveyor belt scale according to claim 1, wherein the frame that carries the conveyor belt is equipped with wheels that can run on rails, for bringing the conveyor belt with the related scale elements into the pressure-resistant, explosion-protected housing and/or removing it from it.

6. The conveyor belt scale according to claim 1, wherein the drive roller of the conveyor belt is equipped with a coupling element, and the drive motor is equipped with a corresponding coupling element, for tool-free coupling and uncoupling of the drive roller.

\* \* \* \* \*